(12) United States Patent
Kang et al.

(10) Patent No.: US 8,587,478 B1
(45) Date of Patent: Nov. 19, 2013

(54) LOCALIZATION METHOD OF MULTIPLE JAMMERS BASED ON TDOA METHOD

(71) Applicant: Korea Aerospace Research Institute, Daejeon (KR)

(72) Inventors: Hee Won Kang, Daejeon (KR); Deok Won Lim, Daejeon (KR); Moon-Beom Heo, Daejeon (KR)

(73) Assignee: Korea Aerospace Research Institute, Daejeon (KR)

( * ) Notice: Subject to any disclaimer, the term of this patent is extended or adjusted under 35 U.S.C. 154(b) by 0 days.

(21) Appl. No.: 13/857,917

(22) Filed: Apr. 5, 2013

(30) Foreign Application Priority Data

Sep. 3, 2012 (KR) .......................... 10-2012-0097281

(51) Int. Cl.
*G01S 1/24* (2006.01)

(52) U.S. Cl.
USPC ....................................................... 342/387

(58) Field of Classification Search
USPC ....................................................... 342/387
See application file for complete search history.

(56) References Cited

U.S. PATENT DOCUMENTS

| RE39,053 E * | 4/2006 | Rees ................................ 342/29 |
| 8,077,091 B1 * | 12/2011 | Guigne et al. ................ 342/465 |
| 2005/0125141 A1 * | 6/2005 | Bye ................................ 701/200 |

FOREIGN PATENT DOCUMENTS

| KR | 10-2011-0116022 A | 10/2011 |
| KR | 10-2012-0029003 A | 3/2012 |

OTHER PUBLICATIONS

Hee Won Kang et al., "The Design of Novel TDOA Method for Multiple Jammers Localization", Journal of ICROS (Institute of Control, Robotics and Systems), Apr. 5-6, 2012, pp. 115-116.

* cited by examiner

*Primary Examiner* — Harry Liu (57) ABSTRACT

Disclosed is a localization method of multiple based on a TDOA method, including calculating TDOA measurements step S100 of arranging multiple sensors, and calculating TDOA measurement values while a reference sensor is changed, in turn; locating multiple jammers using all TDOA measurements step S200 of calculating estimated location solutions of the multiple jammers; a finding a searching quadrant step S300 of finding a quadrant having the highest density of the estimated location solutions; a setting a searching range and detecting searching cell step S400 of deciding a searching range, and searching the searching cell; and determining estimated positions of the multiple jammers step S500 of deciding the number of the jammers, and calculating location solutions of the multiple jammers. Therefore, the present invention can accurately localize the multiple jammers.

4 Claims, 5 Drawing Sheets

LOCALIZATION METHOD OF MULTIPLE JAMMERS BASED ON TDOA METHOD

CROSS-REFERENCE(S) TO RELATED APPLICATIONS

The present invention claims priority of Korean Patent Application No. 10-2012-0097281, filed on Sep. 3, 2012, which is incorporated herein by reference.

BACKGROUND OF THE INVENTION

1. Field of the Invention

The present invention relates to a localization method of multiple jammers based on a TDOA method, and which can accurately estimate locations of multiple jammers using TDOA measurements of jamming signal between reference sensor and other sensors.

2. Description of Related Art

GPS (Global Positioning System) is a system for providing services like time, position and velocity of an object using satellites. GPS positioning is obtained by using the received GPS signals at a GPS receiver, and the GPS signals are transmitted from the satellites in the space.

Since GPS signals are transmitted from GPS satellites located at an altitude of about 20,000 km, the power of GPS signals received on the ground is weaker than noise power. In order to receive such weak signal, a GPS receiver should have high sensitivity. As a result, since the GPS receiver receives weak interference signal generated from other signal source and/or even jamming signal, it is very difficult or impossible to acquire good GPS signals and perform the localization. Therefore, in case that the interference signals and/or jamming signals are included in the GPS signals, availability of the GPS is extremely deteriorated.

Recently, damage from the jamming signal, such as aircraft navigation problems, has been sharply increased, and thus a method of reducing the damage from such jamming signal has been studied. As examples of the localization method of the jammer, there are a TOA (Time Of Arrival) method using a signal arrival time, a TDOA (Time Difference Of Arrival) method using a time difference of signal arrival, an AOA (Angle Of Arrival) method using an arrival angle of signal, and an RSSI (Received Signal Strength Indication) method using a signal strength.

However, in case of the TOA method, time synchronization between transmitter and receiver is required. In case of the RSSI method, it has low accuracy. In case of the AOA method, it has a lower positioning accuracy than the TDOA method. Therefore, TDOA method has become as a typical method of localizing the source of the jammer.

Figure 1A:
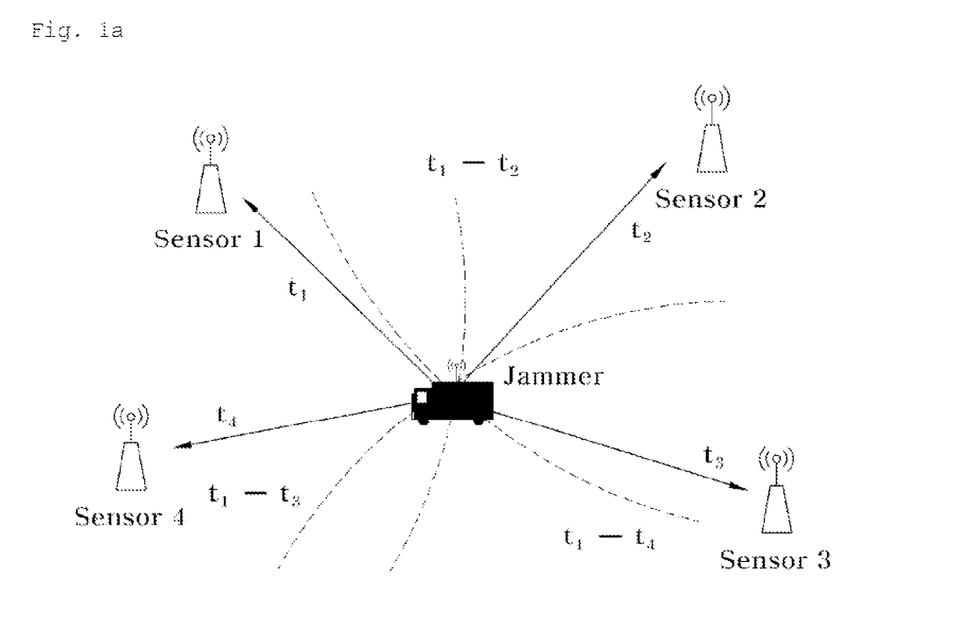
FIG. 1a is a conceptual representation of TDOA localization of jamming signal.

Localization based on a TDOA method uses the time difference of signal arrival, as shown in FIG. 1a, and the location of the jammer is calculated by using a time difference of signal arrival between a reference sensor and other sensors. Herein, the location of the jammer calculated by using TDOA measurement can be represented in the form of a hyperbolic curve, and the position of the jammer can be determined by finding an intersection point of the hyperbolic curves.

Figure 1B:
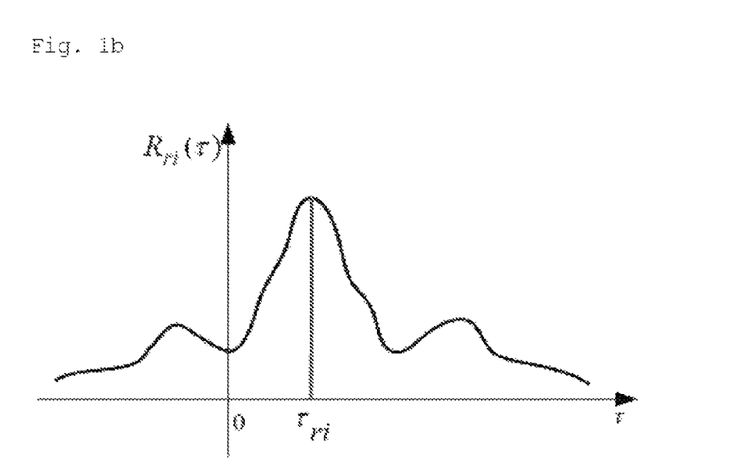
FIG. 1b is a graph showing TDOA measurement values when applying a cross-correlation function in case of one jammer.

Herein, the time difference of signal arrival between the two sensors can be calculated by using a cross-correlation function indicated by Equation 1. When the signals received in the two sensors are cross-correlated with each other, a cross-correlation value $R_{ri}(\tau)$ forms a curve shown in FIG. 1. 1b and has one maximum value. A delay time in the maximum value is the time difference $r_{ri}$ of arrival, i.e., TDOA measurement value.

$$R_{ri}(\tau) \equiv E[s_r(t)s_i(t-\tau)] = \frac{1}{T}\int_0^T s_r(t)s_i(t-\tau)\,d\tau \qquad \text{[Equation 1]}$$

Wherein $s_r(t)$ is signal received at reference sensor, $s_i(t)$ is signal received at ith sensor, T is the period of signal, $\tau$ is time delay.

However, in case that there are two or more jamming signals, multiple maximum values (peaks) are formed when performing the cross-correlation with respect to the received signals. In this case, since it is difficult to distinguish true values and false values among the maximum values, it is actually impossible to localize the multiple jammers by using only the conventional TDOA method.

Therefore, it is required to develop a new localization method of multiple jammers, which can accurately localize the jammers even when there are multiple jammers.

SUMMARY OF THE INVENTION

An embodiment of the present invention is directed to providing a localization method of multiple jammers, which can accurately localize the multiple jammers based on a TDOA method.

To achieve the object of the present invention, the present invention provides a localization method of multiple jammers based on a TDOA method, including calculating TDOA measurements step of arranging multiple sensors for receiving GPS signal, and calculating TDOA measurements while a reference sensor is changed, in turn, with respect to the multiple sensors; a locating multiple jammers by using all TDOA measurements step of calculating position of the multiple jammers using all TDOA measurements; a finding a searching quadrant step of finding a quadrant having the highest density of the estimated location solutions including the true and false location solutions; a setting a searching range and detecting searching cell step of deciding a searching range based on a size of the searching cell previously preset in the found quadrant, and detecting the searching cell including all true location solutions corresponding to the number of the sensors while shifting by searching intervals; and a Determining estimated positions of the multiple jammers step of deciding the number of the jammers by calculating an average value of distances among the true location solutions in the searching cell having the true location solutions corresponding to the number of the sensors, and calculating location solutions of the multiple jammers.

DESCRIPTION OF SPECIFIC EMBODIMENTS

Hereinafter, the embodiments of the present invention will be described in detail with reference to accompanying drawings.

Figure 2:
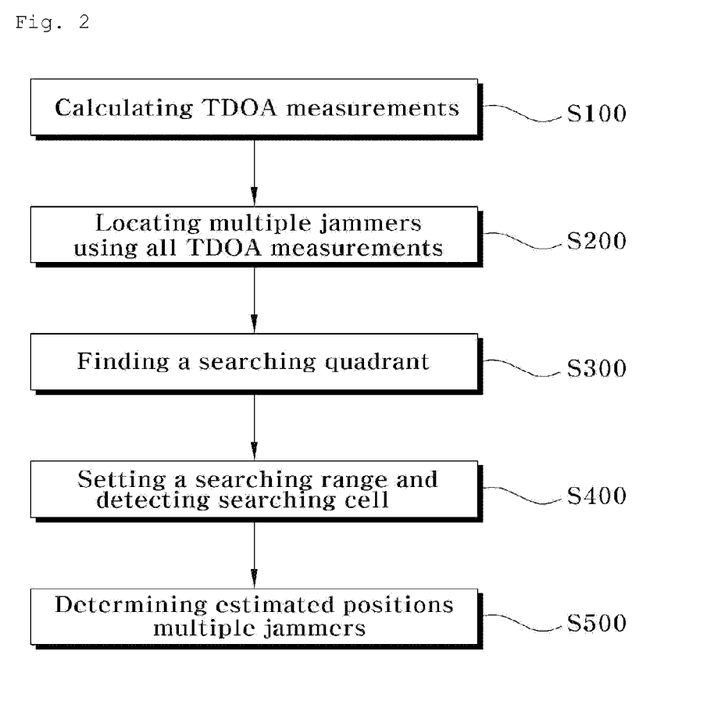
FIG. 2 is a flow chart of a localization method of multiple jammers based on a TDOA method according to the present invention.

The present invention is to provide a localization method of multiple jammers using a TDOA method. To this end, as shown in FIG. 2, the present invention includes a step S100 of calculating TDOA measurements, a step S200 of locating multiple jammers by using all TDOA measurements, a step S300 of finding a searching quadrant, a step S400 of setting a searching range and detecting a searching cell, and a step S500 of determining estimated positions of the multiple jammers.

(1) Step S100 of Calculating TDOA Measurements,

In the step S100 of calculating TDOA measurements, the TDOA measurement is found by using GPS signal received from multiple (N) sensors (GPS receives). When finding the TDOA measurements computed at a computer of the central tracking system, one of the N sensors is selected as a reference sensor, and the TDOA measurement, i.e., a time difference of arrival between the reference sensor and other sensor is calculated, while the reference sensor is changed in turn.

In case that there is only a single jammer, the TDOA measurement value $\tau_{ri}$ between a reference sensor and an i-th sensor is a time when a cross-correlation value $R_{ri}(\tau)$ found by performing the cross-correlation function of the Equation 1 becomes a maximum peak.

$$R_{ri}(\tau) \equiv E[s_r(t)s_i(t-\tau)] = \frac{1}{T}\int_0^T s_r(t)s_i(t-\tau)\,d\tau \quad \text{[Equation 1]}$$

Wherein $s_r(t)$ is signal received at reference sensor, $s_i(t)$ is signal received at i-th sensor, T is the period of signal, $\tau$ is time delay.

The TDOA measurement $\tau_{ri}$ is the time difference of arrival between the reference sensor and i-th sensor and can be expressed by a function with respect to the with a position of jammer, reference sensor and i-th sensor like Equation 2, as follows:

$$\tau_{ri} = (t_r - t_s) - (t_i - t_s) \quad \text{[Equation 2]}$$
$$= \frac{\sqrt{(x-x_r)^2 + (y-y_r)^2} - \sqrt{(x-x_i)^2 + (y-y_i)^2}}{c}$$
$$= f_{r,i}(x, y, x_r, y_r, x_i, y_i)$$

wherein $t_s$ is a time when the jammer transmits signal, $t_r$ is a time when the reference sensor receives the jamming signal, $t_i$ is a time when the i-th sensor receives the jamming signal, (x,y) is a location coordinate of the jammer, $(x_r, y_r)$ is a location coordinate of the reference sensor, and c is a propagation velocity.

(2) Step S200 of Locating Multiple Jammers by using all TDOA Measurements

In the step S200 of locating multiple jammers by using all TDOA measurements, a location coordinates of multiple jammers (hereinafter, called "location solution") are calculated by using all TDOA measurements $\tau_{ri}$ calculated in the step S100 and this process is performed at the computer of the central tracking system.

If the TDOA measurement value is found, an estimated value (x,y) of the jammer can be calculated by using the Equation 4, as follows. However, because the Equation 2 is a nonlinear equation, it is difficult to directly calculate the estimated value (x,y). Therefore, if the Taylor series is applied to the Equation 2, the Equation 2 can be linearized into Equation 3, as follows:

$$\tau_{ri} = f_{r,i}(\Box) \quad \text{[Equation 3]}$$
$$= \frac{1}{c}\Big(\sqrt{(x_0-x_r)^2+(y_0-y_r)^2} -$$
$$\sqrt{(x_0-x_i)^2+(y_0-y_i)^2}\,\Big) +$$
$$\frac{1}{c}\bigg(\frac{x_0-x_i}{\sqrt{(x_0-x_i)^2+(y_0-y_i)^2}} -$$
$$\frac{x_0-x_r}{\sqrt{(x_0-x_r)^2+(y_0-y_r)^2}}\bigg)\delta x +$$
$$\frac{1}{c}\bigg(\frac{y_0-y_i}{\sqrt{(x_0-x_i)^2+(y_0-y_i)^2}} -$$
$$\frac{y_0-y_r}{\sqrt{(x_0-x_r)^2+(y_0-y_r)^2}}\bigg)\delta y + \ldots$$

If second or more order terms are eliminated in the Equation 3, it can be linearized into Equation 4.

$$\tau_{ri} = f_{r,i}(\Box) \cong f_{r,i}(\Box)|_{(x_0,y_0)} + \quad \text{[Equation 4]}$$
$$\frac{\partial f_{r,i}(\Box)|_{(x_0,y_0)}}{\partial x_0}\delta x + \frac{\partial f_{r,i}(\Box)|_{(x_0,y_0)}}{\partial y_0}\delta y$$
$$= \frac{1}{c}\Big(\sqrt{(x_0-x_r)^2+(y_0-y_r)^2} -$$
$$\sqrt{(x_0-x_i)^2+(y_0-y_i)^2}\,\Big) +$$
$$\frac{1}{c}\bigg(\frac{x_0-x_i}{\sqrt{(x_0-x_i)^2+(y_0-y_i)^2}} -$$
$$\frac{x_0-x_r}{\sqrt{(x_0-x_r)^2+(y_0-y_r)^2}}\bigg)\delta x +$$
$$\frac{1}{c}\bigg(\frac{y_0-y_i}{\sqrt{(x_0-x_i)^2+(y_0-y_i)^2}} -$$
$$\frac{y_0-y_r}{\sqrt{(x_0-x_r)^2+(y_0-y_r)^2}}\bigg)\delta y$$

wherein $(x_0, y_0)$ is an initial position of jammer.

Assuming that there are N sensors, if a reference sensor r is sensor 1, i-th sensors are sensor 2, sensor3, sensor N, in turn, it can be expressed by Equation 5 which is a matrix, as follows:

$$\frac{1}{c}\begin{bmatrix} G_{x21} & G_{y21} \\ G_{x31} & G_{y31} \\ \vdots & \vdots \\ G_{xN1} & G_{yN1} \end{bmatrix}\begin{bmatrix} \delta x \\ \delta y \end{bmatrix} = \begin{bmatrix} \tau_{12} - \tau_{12}|_{(x_0,y_0)} \\ \tau_{13} - \tau_{13}|_{(x_0,y_0)} \\ \vdots \\ \tau_{1N} - \tau_{N2}|_{(x_0,y_0)} \end{bmatrix} \Rightarrow G\delta = Z \quad \text{[Equation 5]}$$

wherein $G_{xi1}$ is $$\frac{x_0 - x_i}{(x_0-x_i)^2 + (y_0-y_i)^2} - \frac{x_0 - x_r}{(x_0-x_r)^2 + (y_0-y_r)^2}, G_{yi1} \text{ is}$$

$$\frac{y_0 - y_i}{(x_0-x_i)^2 + (y_0-y_i)^2} - \frac{y_0 - y_r}{(x_0-x_r)^2 + (y_0-y_r)^2}, \tau_{1i}\Big|_{(x_0,y_0)}$$

is $\frac{\sqrt{(x_0-x_r)^2+(y_0-y_r)^2} - \sqrt{(x_0-x_i)^2+(y_0-y_i)^2}}{c}, \delta$ δ is position variation and Z is residual (a difference between a measurement value and an estimated value).

In the Equation 5, since it is difficult to directly find the position variation δ, an estimated value of the position variation is used. To this end, the present invention uses Equation 6 which was proposed in "Position-location solution by Taylor-series Estimation" (IEEE Transaction on Aerospace and Electronic Systems, vol. AES-12, no.2, pp. 187-194, March, 1976) by W. H. Foy, as follows:

[Equation 6]

$$\delta = [G^T Q^{-1} G]^{-1} G^T Q^{-1} Z,$$

wherein Q is a covariance matrix of a measurement error.

Therefore, as shown in Equation 7 as follows, an estimated location solution $(\hat{x},\hat{y})$ of the jammer can be found by adding the initial position $(x_0,y_0)$ and the position variation δ estimated by the Equation 6.

$$\begin{bmatrix} \hat{x} \\ \hat{y} \end{bmatrix} = \begin{bmatrix} x_0 \\ y_0 \end{bmatrix} + \begin{bmatrix} \delta \hat{x} \\ \delta \hat{y} \end{bmatrix} \quad \text{[Equation 7]}$$

As shown in the Equation 7, the estimated position $(\hat{x},\hat{y})$ of the jammer is largely influenced by the initial position $(x_0,y_0)$. Thus, the final estimated position $(\hat{x},\hat{y})$ of the jammer is not found by only a single calculation process. Instead, the estimated position $(\hat{x},\hat{y})$ found by the Equation 7 is substituted again to the initial position $(x_0,y_0)$, and then the process from the Equation 4 to the Equation 7 is repeated, thereby finding the estimated position $(\hat{x},\hat{y})$. This process is repeated until satisfying a stop condition. For example, the stop condition may be a case that the position variation $\hat{\delta}$ is less than a predetermined threshold value TH.

As described above, in the estimated location solution calculated by the Steps S100 and S200, in case of there is one jammer, maximum value (peak) is appeared only when calculating the TDOA measurement value by using the cross-correlation function of the Equation 1. Thus, it is easy to find the location of the jammer, because the estimated position is only one.

However, in case that there are multiple jamming signals (jammers), multiple peaks are appeared when calculating the TDOA measurement value by using the cross-correlation function. For example, assuming that there are two jammers A and B, and $s^a(t)$ is a received signal from jammer A and $s^b(t)$ is a received signal form jammer B, if these signals are applied to the cross-correlation function of the Equation 1, it can be expressed by Equation 8 as follows:

$$R_{ri}(\tau) \equiv E[s_r(t)s_i(t-\tau)] = \frac{1}{T}\int_0^T s_r(t)s_i(t-\tau)d\tau \quad \text{[Equation 8]}$$

$$= \frac{1}{T}\int_0^T ((s^a(t) +$$

$$s^b(t))(s^a(t-\tau) +$$

$$s^b(t-\tau)))d\tau$$

$$= \frac{1}{T}\int_0^T (s^a(t) + s^a(t-\tau))d\tau +$$

$$\frac{1}{T}\int_0^T (s^a(t-\tau)s^b(t))d\tau +$$

$$\frac{1}{T}\int_0^T (s^b(t-\tau)s^a(t))d\tau +$$

$$\frac{1}{T}\int_0^T (s^b(t-\tau)s^b(t-\tau))d\tau$$

wherein, $s_r(t)$ is a signal received at reference sensor, $s_i(t)$ is a signal received at i-th sensor, T is the period of signal, τ is time delay, $s_r(t)$ is $s^a(t-(t_r-t_s))+s^b(t-(t_r-t_s))$, $s_i(t)$ is $s^a(t-(t_i-t_s))+s^b(t-(t_i-t_s))$.

Figure 3:
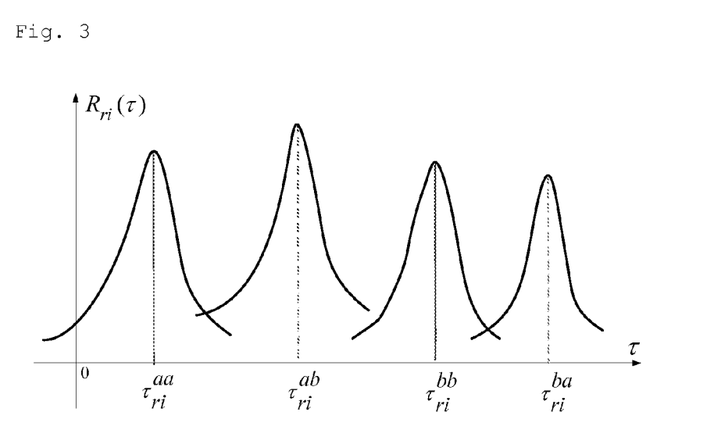
FIG. 3 is a graph showing TDOA measurements when applying a cross-correlation function in case of multiple jammers.

As described above, in case that there are two jammers, as shown in FIG. 3a, four TDOA measurement values including two false values can be obtained. Therefore, in case that there are two or more jammers, it is extremely difficult to accurately estimate the position of the multiple jammers only using the conventional TDOA method. Thus, the inventors performed an simulation that four sensors 1, 2, 3 and 4 were arranged in the state of knowing true positions of two jammers A and B in order to confirm correlation between the estimated location solutions and the true positions of the jammers.

Figure 4:
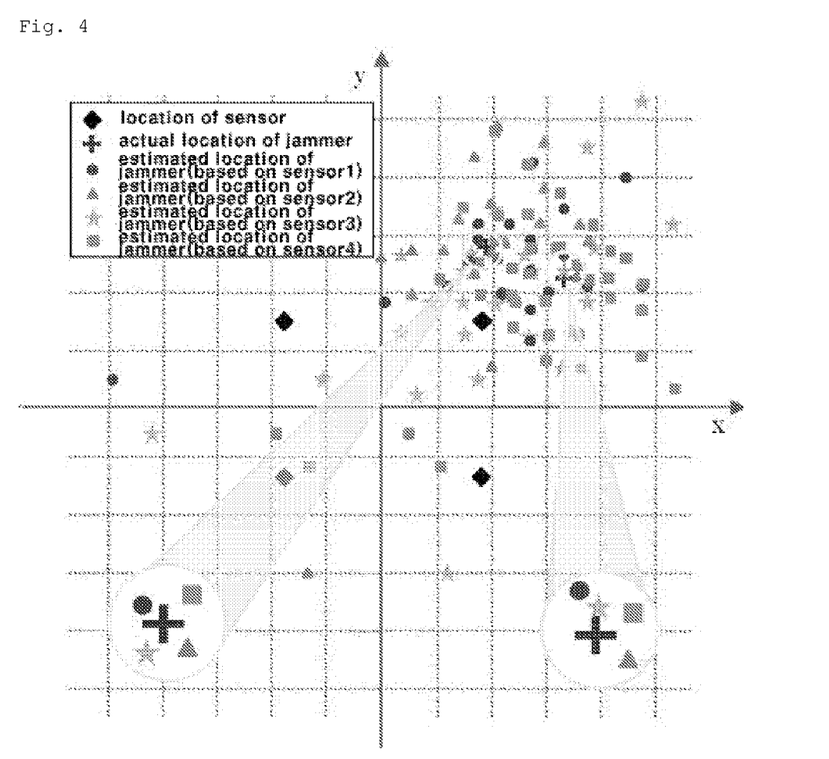
FIG. 4 is a graph showing all estimated location solutions on coordinate according to the present invention.

Firstly, if the TDOA measurement value is found while a first sensor is selected as the reference sensor, 3 TDOA measurement values are calculated. And if the location solution is estimated from the combination of the TDOA measurement values, 64 location solutions (estimated location solutions) are calculated. Therefore, if the TDOA measurement values are found while the reference sensor is changed in turn, and then the location solutions are estimated from the combination thereof, 264 estimated location solutions are calculated finally. As shown in FIG. 4, the 264 estimated location solutions can be indicated on coordinate which has a starting point at the center portion of the four sensors.

As shown in FIG. 4, if jammer positions is estimated by combination of all TDOA measurements, the results of positioning for combinations of true TDOA measurements for each reference sensor are close to the position of true multiple jammers. Therefore it is possible to accurately localize the multiple jammers by finding a location on which the true estimated location solutions for each reference sensor are grouped.

Herein, the terms "true estimated location solutions for each reference sensor" will be described. If the jammers A and B transmit $s^a(t)$ and $s^b(t)$, respectively, the TDOA measurement values $\tau_{12}^{aa}, \tau_{13}^{aa}, \tau_{14}^{aa}, \tau_{12}^{bb}, \tau_{13}^{bb}$ and $\tau_{14}^{bb}$ is true TODA measurements (when sensor 1 is the reference sensor.) and the estimated positions from the true TDOA measurement values are the true location solutions.

(3) Step S300 of Finding a Searching Quadrant

In this step S300, a quadrant having the highest density of the estimated location solutions including the true and false location solutions found in the step S200 is found at the computer of the central tracking system.

Figure 5:
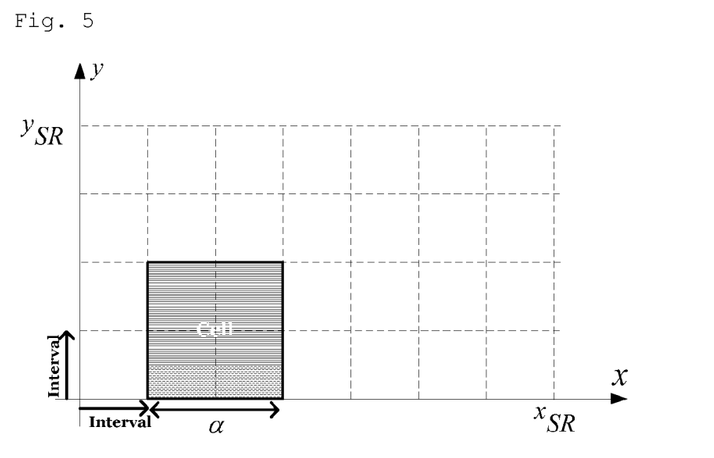
FIG. 5 is a concept view showing the relationship of a searching range, a searching cell and a searching interval.

In the present invention, the coordinate used for finding the searching quadrant is set by installation locations of the sensors, as described above. Herein, the starting point of the coordinate is an intersection point when the sensors are connected by imaginary lines (4) Step S400 of Setting a Searching Range and Detecting Searching Cell In this step S400, a searching range is decided by below Equation 9 on the basis of a size of a searching cell previously set in the quadrant found in the step S300, and all of the searching cells including the true location solutions for each reference sensor, for example the searching cells including all of four location solutions calculated from each reference sensor are searched while shifting by searching intervals, thereby fining the searching cell in which the jammer is located. FIG. 5 shows the relationship of the searching range, the searching cell and the searching interval. This step is performed at the computer of the central tracking system.

In the present invention, only the quadrant in which the jammer is actually located on coordinate on which the location solutions are indicated is searched, and the rest quadrants are excluded from the searching range. Therefore, it is possible to simplify the location searching process.

$$(x_{SR}, y_{SR}) \equiv \left( \frac{\hat{x}}{|\hat{x}|} \alpha \left\lceil \frac{\max(|\hat{x}|)}{\alpha} \right\rceil, \frac{\hat{y}}{|\hat{y}|} \alpha \left\lceil \frac{\max(|\hat{y}|)}{\alpha} \right\rceil \right) \quad \text{[Equation 9]}$$

wherein $(x_{SR}, y_{SR})$ is the searching range, $(\hat{x}, \hat{y})$ is the estimated location solution, and $\alpha$ is a magnitude of searching cell which is an integer.

(5) Step S500 of Determining Location Solutions of Multiple Jammers

In the step S500 of determining location solution of multiple jammers, in case that a searching cell having the true location solutions corresponding to the number (N) of the sensors is searched as a result of the Step 400, an average value of the distances among the true location solutions in the searching cell is found, and then the number of the jammers is decided by using the average value, and then the location solution of each jammer is calculated. This step is also performed at the computer of the central tracking system.

As a result of performing the step 400 of setting the searching range and detecting searching cell, in case that there is a searching cell having the true location solutions corresponding to the number (N) of the sensors, it is possible to estimate the presence of the jammer. Herein, multiple searching cells having the true location solutions corresponding to the number (N) of the sensors may be searched. Therefore, in the present invention, each distance $\rho_{EP}$ between the true location solutions in the searching cell is calculated by Equation 10, as follows:

$$\rho_{EP} \equiv \sqrt{(|\hat{x}_1 - \hat{x}_2|)^2 + (|\hat{y}_1 - \hat{y}_2|)^2} + \sqrt{(|\hat{x}_1 - \hat{x}_3|)^2 + (|\hat{y}_1 - \hat{y}_3|)^2} + \ldots + \sqrt{(|\hat{x}_1 - \hat{x}_N|)^2 + (|\hat{y}_1 - \hat{y}_N|)^2} \quad \text{[Equation 10]}$$

wherein $(\hat{x}_i, \hat{y}_i)$ is the estimated location solution when a i-th sensor is selected as the reference sensor.

If the distances $\rho_{EP}$ among the true location solution in the searching cell are calculated, they are arranged in order from a small value, and then a variation rate of the distances $\rho_{EP}$ is found in order to decide the number of the jammers. Because the variation rate of the distances $\rho_{EP}$ among the true location solution is suddenly changed at more than the actual number of the jammers, the number before the variation rate of the distances $\rho_{EP}$ among the true location solutions is suddenly and largely changed into more than a certain value is set as the number of the jammers.

If the number of the jammers is decided, as described above, the location solutions of the jammers are calculated. Herein, each location solution of the jammers is found by calculating an average value of the estimated location solutions using Equation 11, as follows:

$$\begin{bmatrix} x_j \\ y_j \end{bmatrix} = \frac{1}{N} \begin{bmatrix} \sum_{i=1}^{N} \hat{x}_i \\ \sum_{i=1}^{N} \hat{y}_i \end{bmatrix} \quad \text{[Equation 11]}$$

wherein (x,y) is the location solution of the jammer, $(\hat{x}_i, \hat{y}_i)$ is the estimated location solution when a i-th sensor is selected as the reference sensor, j=1, 2, 3, ..., M and M is the number of the jammers.

In order to confirm the usefulness of the localization method of the multiple jammers based on the TDOA method according to the present invention, the inventors simulated it. Hereinafter, it will be described.

The simulation was a MATLAB-based Monte-Carlo simulation which was performed 100 times, and four sensors were used in order to receive the signal. The sensors are arranged at (−2000, −2000), (−2000, 2000), (2000, −2000) and (2000, 2000)[m] in the form of a square.

The jammers were arbitrary located at (868.2, 4924) and (2250, 3897)[m], and a sampling frequency was set to 26,856 [MHz]. The jamming signal was an AWGN (Additive White Gaussian Noise) type, and transmission power was 5[mW], and the size of the searching cell was 2000×2000 [m], and the searching range was 1000 [m].

Figure 6:
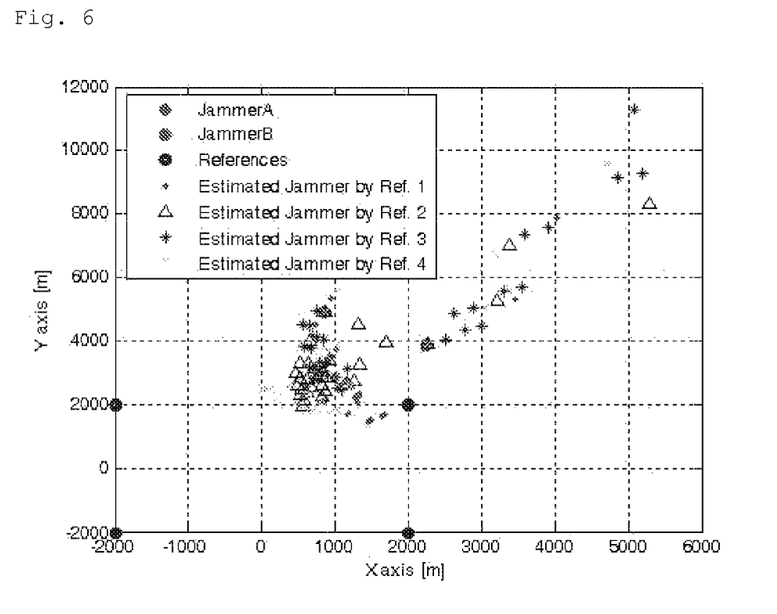
FIG. 6 is a graph showing all estimated location solutions on coordinate when performing a simulation according to the present invention.
Figure 7:
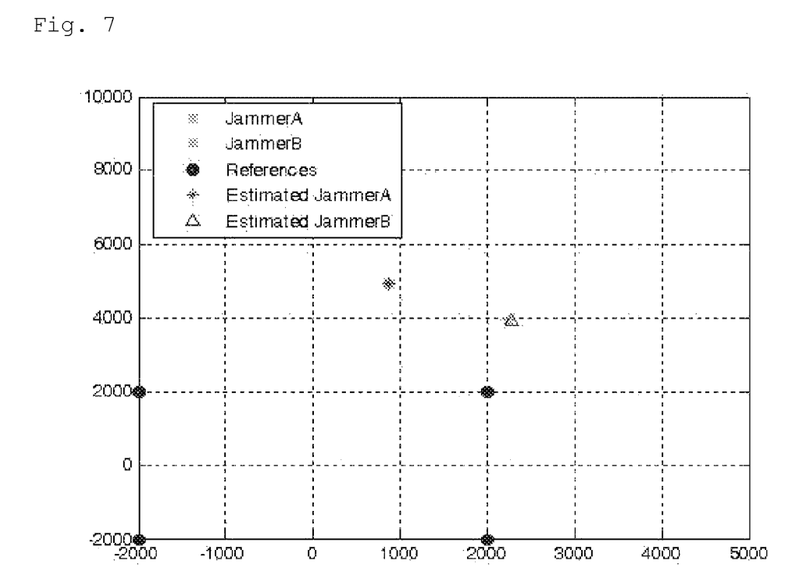
FIG. 7 is a graph showing a localization result of multiple jammers when performing a simulation according to the present invention.

For comparison, the locations of the jammers are estimated from the all TDOA measurement values obtained by the cross-correlation while the reference sensor is changed in turn. As a result, in case of the conventional method, the multiple jammers are localized from the combination of all of the true and false TDOA measurement values, and thus if the true estimated values of the jammers are not converged into one location value but are distributed widely, as shown in FIG. 6. However, in case of the localization method according to the present invention, the average value of the true estimated values is converged around the actual location of the jammer.

According to the present invention as described above, in order to localize the multiple jammers, the estimated location solutions obtained on the basis of the TDOA method are indicated on coordinate, and thus the locations of the jammers are accurately estimated by finding the grouped location of the true location solutions for each reference sensor.

What is claimed is:

1. A localization method of multiple jammers at a computer of the central tracking system based on a TDOA method, comprising:

calculating TDOA measurements of arranging multiple sensors for receiving GPS signal, and calculating TDOA measurement values $\tau_{ri}$ while a reference sensor is changed, in turn, with respect to the multiple sensors;

locating multiple jammers using all TDOA measurements of calculating estimated location solutions of the multiple jammers using all TDOA measurement values;

finding a searching quadrant of finding a quadrant having the highest density of the estimated location solutions on the basis of the sensors;

setting a searching range and detecting searching cell of deciding a searching range based on a size of the searching cell previously preset in the found quadrant, and searching the searching cell including all true location solutions corresponding to the number of the sensors while moving by searching intervals; and determining estimated positions of the multiple jammers of deciding the number of the jammers by calculating an average value of distances among the true location solutions in the searching cell having the true location solutions corresponding to the number of the sensors, and calculating location solutions of the multiple jammers.

2. The localization method according to claim 1, wherein, in the a setting a searching range and detecting searching cell step S400, the searching range is set by Equation 9, as follows:

[Equation 9]

$$(x_{SR}, y_{SR}) \equiv \left( \frac{\hat{x}}{|\hat{x}|} \alpha \left\lceil \frac{\max(|\hat{x}|)}{\alpha} \right\rceil, \frac{\hat{y}}{|\hat{y}|} \alpha \left\lceil \frac{\max(|\hat{y}|)}{\alpha} \right\rceil \right)$$

wherein $\alpha$ is a size of searching cell which is an integer.

3. The localization method according to claim 1, wherein the distances $\rho_{EP}$ among the true location solutions in the searching cell are calculated by below Equation 10 in the determining estimated positions of the multiple jammers step S500, and then the number of the jammers is set to the number before a variation rate of the distances $\rho_{EP}$ among the true location solutions is suddenly and largely changed:

[Equation 10]

$$\rho_{EP} \equiv \sqrt{(|\hat{x}_1 - \hat{x}_2|)^2 + (|\hat{y}_1 - \hat{y}_2|)^2} + \sqrt{(|\hat{x}_1 - \hat{x}_3|)^2 + (|\hat{y}_1 - \hat{y}_3|)^2} + \ldots + \sqrt{(|\hat{x}_1 - \hat{x}_N|)^2 + (|\hat{y}_1 - \hat{y}_N|)^2}$$

wherein $(\hat{x}_i, \hat{y}_i)$ is the estimated location solution when a i-th sensor is selected as the reference sensor.

4. The localization method according to claim 2, wherein each of the location solutions of the jammers is found by calculating an average value with respect to the estimated location solutions using Equation 11, as follows:

[Equation 11]

$$\begin{bmatrix} x_j \\ y_j \end{bmatrix} = \frac{1}{N} \begin{bmatrix} \sum_{i=1}^{N} \hat{x}_i \\ \sum_{i=1}^{N} \hat{y}_i \end{bmatrix}$$

wherein (x,y) is the location solution of the jammer, $(\hat{x}_i, \hat{y}_i)$ is the estimated location solution when a i-th sensor is selected as the reference sensor, j=1, 2, 3, . . . , M and M is the number of the jammers.

* * * * *